UNITED STATES PATENT OFFICE.

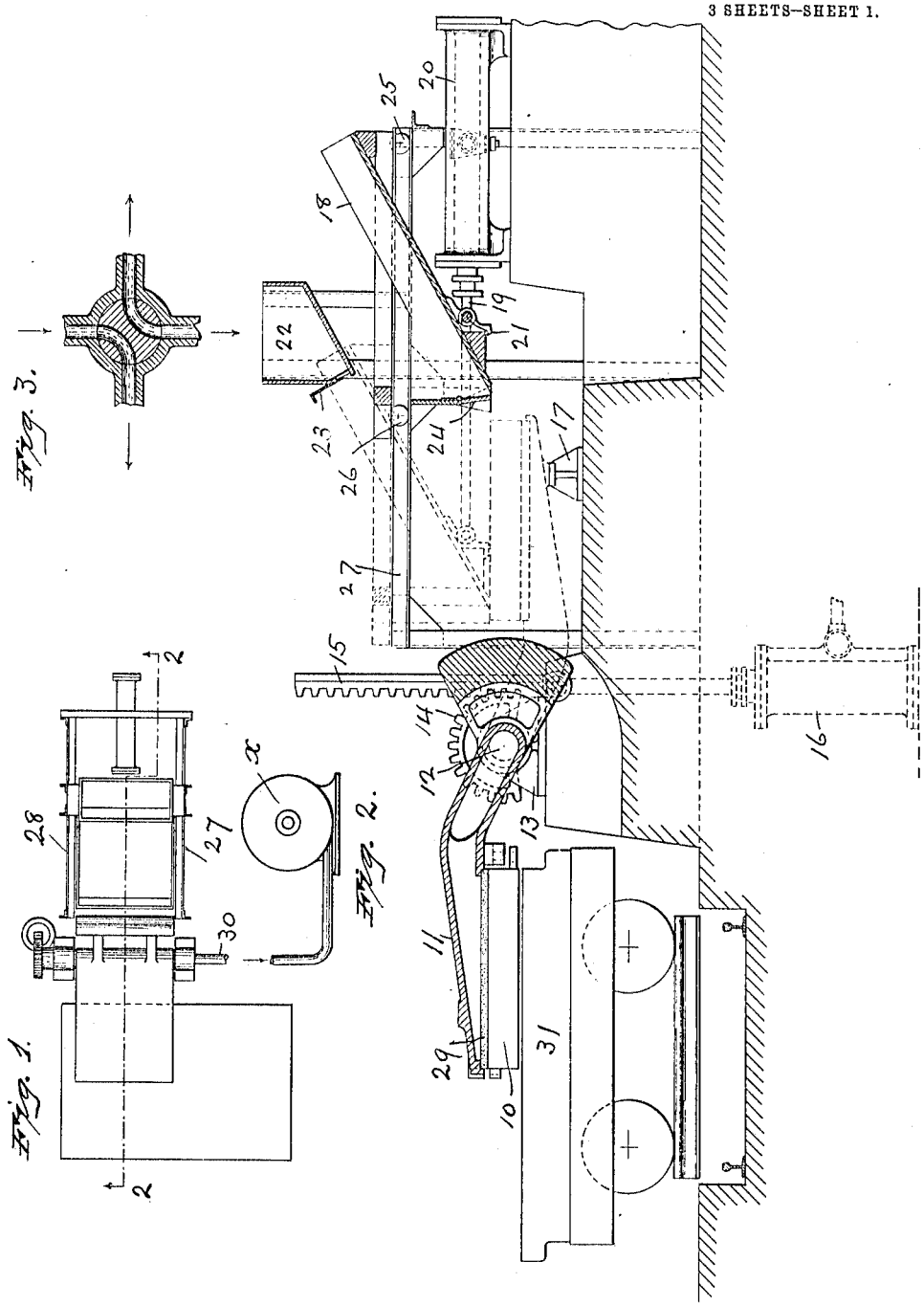

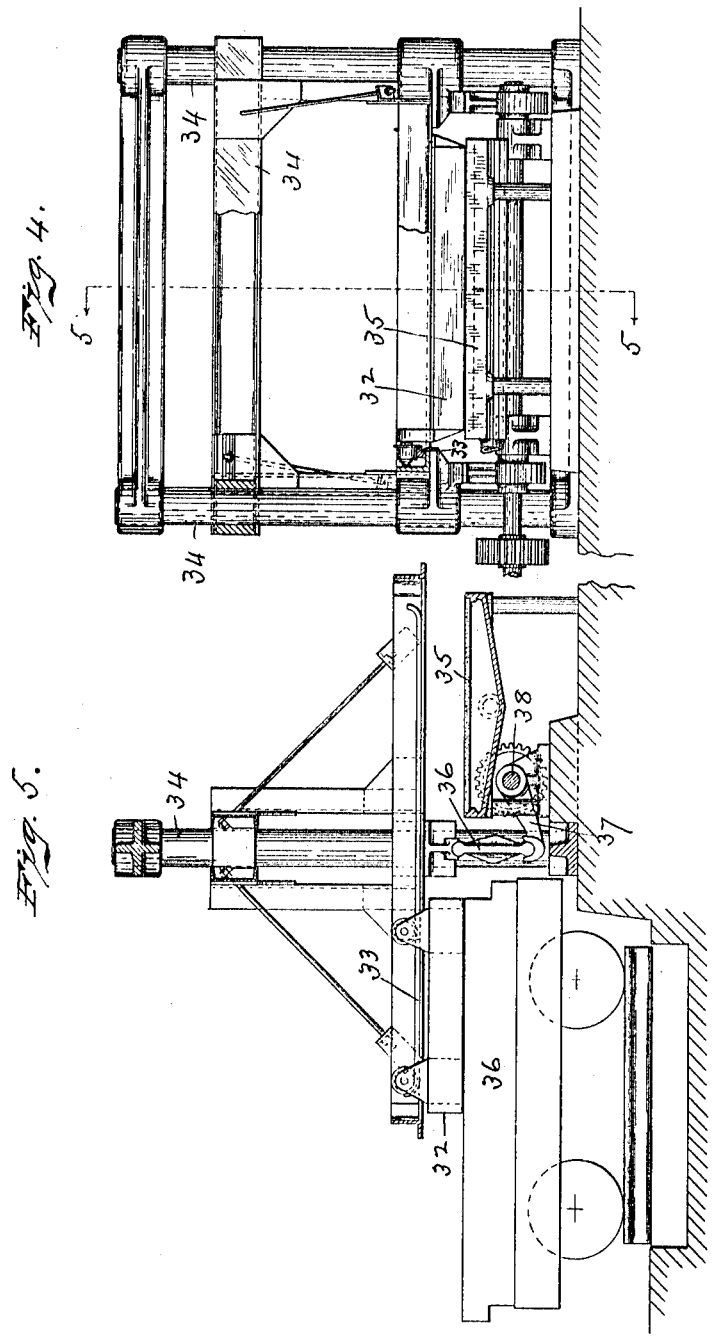

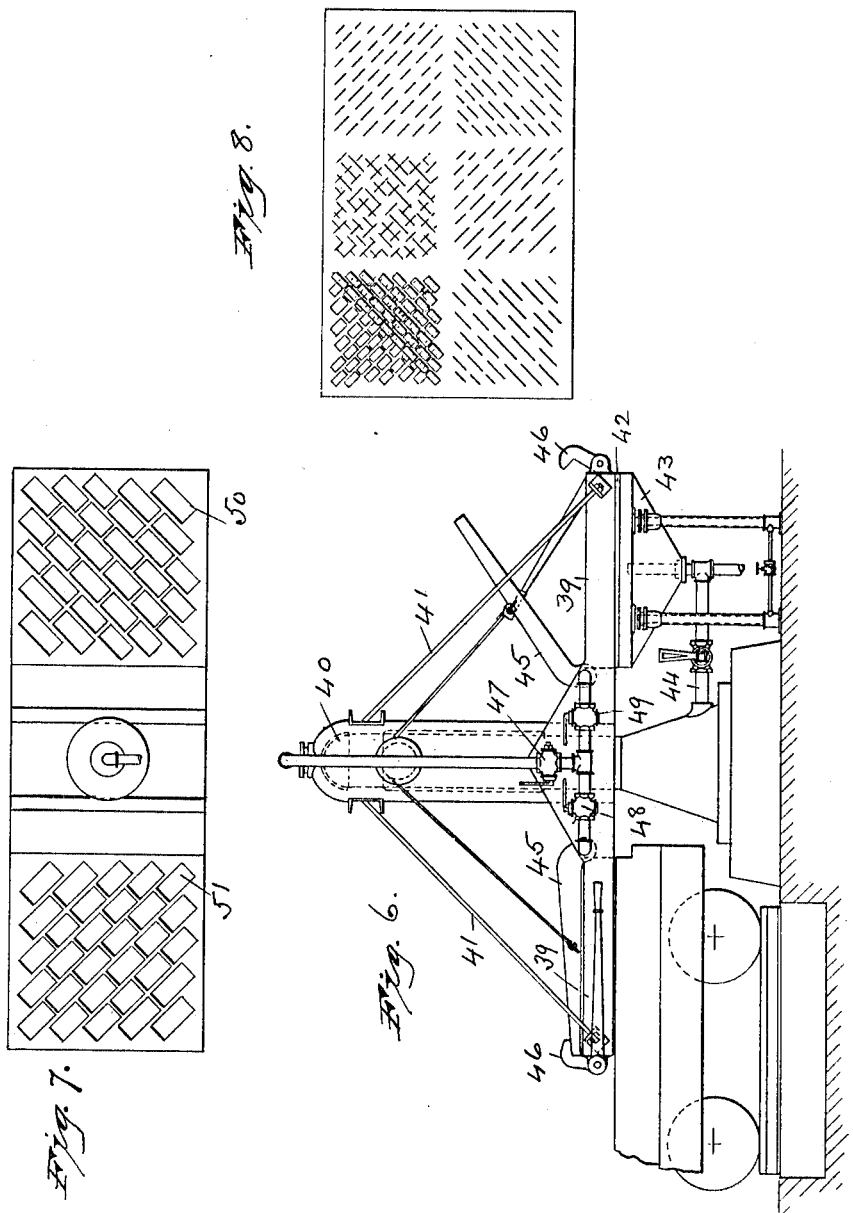

NILS V. HANSELL, OF BLOOMFIELD, NEW JERSEY, ASSIGNOR TO AMERICAN GRONDAL COMPANY, OF NEW YORK, N. Y., A CORPORATION OF NEW YORK.

BRIQUETING APPARATUS.

1,105,510.  Specification of Letters Patent.  Patented July 28, 1914.

Application filed January 5, 1912. Serial No. 669,582.

*To all whom it may concern:*

Be it known that I, NILS V. HANSELL, a subject of the King of Sweden, and residing at Bloomfield, in the county of Essex and State of New Jersey, have invented a certain new and Improved Briqueting Apparatus, of which the following is a specification.

My invention relates to briqueting apparatus and particularly to apparatus for briqueting ore or the like as it comes from magnetic separators of the wet type, the particular object of my invention being to provide a mold having means for effecting the pneumatic extraction of the major part of the water commonly mingled with ore, and secondly to provide an apparatus by which the thus dried briquets may be readily discharged upon a conveniently arranged truck to be passed through a briqueting furnace.

In the accompanying drawings, Figure 1 is a plan of an apparatus embodying my invention therefor; Fig. 2 is a cross section on the line 2—2, Fig. 1; Fig. 3 is a cross section of a detail; Fig. 4 is a broken elevation of another embodiment of my invention; Fig. 5 is a section on the line 5—5, Fig. 4; Fig. 6 is a side elevation of another embodiment of my invention; Fig. 7 is a plan of the briqueting mold; and Fig. 8 is a diagrammatic plan of a car-load.

Referring to the form of my invention illustrated in Figs. 1 and 2, the apparatus here shown comprises a mold form 10, carried by the arm 11, which is pivoted upon a horizontal hollow spindle 12 journaled in the bearings 13. A segmental rack 14, fast with the pivot spindle 12, is geared with a vertically moving rack 15, operated by a hydraulic ram 16, so that the arm 11 may be swung through a half circle from the filling position, illustrated in dotted lines, Fig. 2, to the discharging position, shown in full lines. When in filling position, the arm 11 is supported on the stop 17. In this position a distributing filler apron 18 supported on rollers 25, 26, which travel on the rails 27, 28, may be moved across the mold by the plunger 19 of the cylinder 20, which is jointed at 21 to the apron 18. Arranged above the apron 18, I secure the delivery hopper 22, the discharge from which is controlled by the gate valve 23. When the apron 18 is in the position indicated in dotted lines, it delivers to one side of the briqueting mold and as the piston 19 is retracted, the apron travels across the face of the mold distributing and delivering the pulverized ore or other material to the various compartments of the mold. The travel of the apron may be so timed that the mold is filled by a single passage across the face, or if preferred, the apron may be moved across the mold several times delivering a small quantity of the material at each passage. A scraper 24 may be pivoted at the discharge from the apron 18, if desired. Either while the mold 10 is being filled, or after the fill has been completed, the water is pneumatically removed from the briquets through a permeable bottom 29. For this purpose the arm 11 is made hollow and communicates with the pipe 30 through which the water of the briquets is drawn off by a vacuum apparatus diagrammatically represented at $x$. After the mold has been filled and the arm 11 swung over to the position illustrated in Fig. 2, the pneumatic is reversed and pressure instead of suction introduced into the pipe 30 whereupon the briquets in the mold are forced out upon the car 31, over which the mold in this position lies.

In the modification shown in Figs. 4 and 5, the same principle is applied in a different form of apparatus. Here the mold 32 is supported on tracks 33, carried by the frame 34 and is shifted from its position over the permeable bottom 35 which is held in stationary position, to its discharging position over the car 36. In order to insure the clearance of the mold during its travel from one position to the other, the frame 34 is given a vertical motion on the supporting pillars 35, through the link 36 which is connected at its lower end to the lever arm 37 on the gear shaft 38 which may be actuated from any suitable source. The briquets retain their shape in the mold 32 from one position to the other through the surface adhesion of the particles, which are not absolutely dry, and further by reason of the fact that they are more or less compacted in the mold by the air. To discharge the briquets from the mold, it is necessary only to give the latter a few slight taps with a hammer whereupon the briquets drop out upon the car, or the mold may have a lining of known form which may be deposited with the briquets upon the car temporarily.

In Fig. 6 I have illustrated still another form of apparatus in which pneumatic means are employed for the extraction of the moisture from the briquets. For convenience of illustration, the filling device of Fig. 2 has been omitted from Figs. 4 to 6, but it is to be understood that this or other suitable filling device is used for filling the molds 39, which are swung upon the post 40 by the pivoted supporting frame 41. The permeable false bottom 42 for the mold is mounted in stationary position upon the funnel 43 through which the water of the briquets is led to the discharge pipe 44. In filling position, the hollow cover 45 with which each mold is provided, is in raised position, while in the discharging position the cover is lowered and clamped in position over the mold by a latch 46. Valves 47, 48 and 49 control the admission of the air to the cover plates 45 so that the air may be shut off from the one which is in raised position over the mold which is being filled, while it is admitted to the cover of the mold which is in discharging position. Obviously in this case the discharge of the water from the briquets may be effected by lowering the raised cover 46 and admitting compressed air above the filled mold so that the water is pressed out from above instead of sucked out from beneath. It is an advantage also to make the mold with oppositely inclined mold apertures 50 and 51, as in Fig. 7, so that the successive layers of briquets upon the truck may be deposited at right angles to each other. They may thus be stacked without danger of falling and at the same time the greatest amount of air and flame is permitted to have access thereto for drying and burning respectively during the passage of the briquets through the furnace.

The permeable bottom of the mold may be of any suitable character. I have successfully used porous silica brick and also a common filter construction comprising cocoa matting covered with canvas and supported upon a screen.

Various other forms of apparatus for accomplishing the removal of water from the briquets will readily suggest themselves, and I do not limit myself to the precise structures shown.

I claim as my invention:—

1. In a briqueting apparatus, a suction box having a permeable top, a movable mold box supported on said permeable top during the fill thereof with wet briquet material, pneumatic means for removing through said permeable top of the suction box the excess moisture in the briquet material in the mold and means for shifting the mold to discharge position after the extraction of said excess moisture.

2. In a briqueting apparatus, a suction box in fixed position and having a permeable top, a movable mold box resting on said top during the fill thereof with wet briquet material, pneumatic means for removing through said permeable top of the suction box the excess moisture in the briquet material in the mold and a mold carrying frame for lifting the mold from the top of said suction box and shifting it to discharge position.

3. In a briqueting apparatus, a mold, a carrying frame and stationary uprights on which said frame is vertically movable, a permeable bottom for the mold-box in fixed position, pneumatic means for removing excess moisture through said permeable bottom from material in said mold-box and means whereby said mold box may be shifted, when raised, from position over said permeable bottom to discharge position, substantially as described.

4. In a briqueting apparatus, a suction box having a permeable top, a mold-box and a supporting frame therefor vertically adjustable over said suction box to lift the mold-box from the latter and means whereby said mold-box may be moved horizontally on said supporting frame to discharge position.

5. In a briqueting apparatus, a stationary suction box with permeable top, a vertically movable frame overlying said suction box, and a mold-box horizontally movable on said frame from position above said suction box to discharge position, substantially as described.

In testimony whereof I have signed my name to this specification, in the presence of two subscribing witnesses.

NILS V. HANSELL.

Witnesses:
ERIK V. GABRIELSON,
G. B. STAILVON HOLSTEIN.